(12) United States Patent
Chung et al.

(10) Patent No.: US 6,410,147 B1
(45) Date of Patent: Jun. 25, 2002

(54) LOW GLOSS CROSSLINKABLE COATING COMPOSITIONS

(75) Inventors: Ding-Yu Chung, Rochester Hills; Isidor Hazan, Southfield; Donald Albert Paquet, Jr., Troy, all of MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 70 days.

(21) Appl. No.: 09/645,094

(22) Filed: Aug. 24, 2000

(51) Int. Cl.[7] .................. B32B 27/30; B32B 27/36; B32B 27/40

(52) U.S. Cl. .............. 428/423.1; 428/447; 428/480; 428/482; 428/500; 428/520; 427/372.2; 427/384; 427/385.5; 427/387; 525/100; 525/123; 525/165; 525/191; 525/221; 525/222; 525/437; 525/440; 525/444; 525/452; 525/457

(58) Field of Search .............. 428/423.1, 447, 428/480, 483, 500, 520; 427/372.2, 384, 385.5, 387; 525/100, 123, 165, 191, 221, 222, 437, 440, 444, 452, 457

(56) References Cited

U.S. PATENT DOCUMENTS

| | | | |
|---|---|---|---|
| 3,859,120 A | 1/1975 | Schramm | 117/132 CF |
| 4,308,119 A | 12/1981 | Russell | 204/159 |
| 4,348,462 A | 9/1982 | Chung | 428/412 |
| 4,399,192 A | 8/1983 | Russell | 428/412 |
| 4,407,855 A | 10/1983 | Russell | 427/54.1 |
| 4,921,776 A | 5/1990 | Taylor, Jr. | 430/293 |
| 5,019,536 A | 5/1991 | Taylor, Jr. | 428/220 |
| 5,063,091 A | 11/1991 | Martorano | 427/385.5 |
| 5,286,782 A | 2/1994 | Lamb et al. | 524/507 |
| 5,326,820 A | 7/1994 | Hoffmann et al. | 525/123 |
| 5,362,521 A | 11/1994 | Ozaki et al. | 427/407.1 |
| 5,470,893 A | 11/1995 | Sinclair-Day et al. | 523/205 |
| 5,703,198 A * | 12/1997 | Twigt et al. | 427/355 |
| 5,719,251 A | 2/1998 | Wilczek et al. | 528/35 |
| 5,750,234 A | 5/1998 | Johnson et al. | 428/141 |
| 5,847,067 A | 12/1998 | Gras | 528/45 |
| 5,854,385 A | 12/1998 | McGee et al. | 528/369 |
| 5,856,378 A | 1/1999 | Ring et al. | 523/205 |
| 5,925,285 A | 7/1999 | Ramesh | 252/182.28 |
| 6,011,080 A * | 1/2000 | Daly et al. | 427/180 |
| 6,136,882 A * | 10/2000 | Daly et al. | 427/180 |

FOREIGN PATENT DOCUMENTS

| | | |
|---|---|---|
| EP | 0 636 669 A2 * | 2/1995 |
| JP | 55146797 | 1/1980 |
| JP | 57036876 | 8/1982 |
| JP | 05016543 A | 3/1993 |
| JP | 05125221 A | 5/1993 |
| JP | 06329962 A | 11/1994 |
| WO | WO 94/07958 | 4/1994 |
| WO | WO 95/98596 | 3/1995 |

* cited by examiner

Primary Examiner—Vivian Chen
(74) Attorney, Agent, or Firm—Sudhir G. Deshmukh

(57) ABSTRACT

The present invention is directed to a low gloss crosslinkable coating composition that produces a low gloss coating upon cure. The crosslinkable composition includes a binder component and a crosslinking agent. The binder component includes a combination of at least two partially compatible crosslinkable components retained in an evaporable medium, such that the low gloss coating exhibits a 60° specular gloss that is at least 5% lower than gloss of coatings from coating compositions containing any one of the crosslinkable components. The low gloss coating composition of the present invention is especially suited for OEM and refinish automotive coating applications, such as automotive fenders and automotive side boards, typically used in sport utility vehicles.

28 Claims, No Drawings

LOW GLOSS CROSSLINKABLE COATING COMPOSITIONS

BACKGROUND OF THE INVENTION

1. Field of the Invention

The present invention is generally directed to low gloss coating compositions used as basecoats or clearcoats and more particularly directed to low gloss crosslinkable liquid coating compositions that produce low gloss coatings having smooth surfaces.

2. Description of Related Art

Coating compositions have long been used to produce coatings having desired coating characteristics. For instance, coating compositions have been used to enhance surface appearance, such as providing high gloss or low gloss. High gloss surfaces reflect a high proportion of the light directed at them specularly. By contrast, low gloss surfaces reflect a low proportion of the light directed at them specularly. Low gloss coatings that produce less image impairment are aesthetically more pleasing. In the past, coating compositions relied on including flatting agents, such as amorphous silicon dioxide, to produce low gloss coatings. By increasing the loading of the flatting agent in a coating composition, the gloss can be reduced. To attain low gloss in clear coats, coating compositions have to be loaded with an excess amount, typically more than 6 weight percent based on the total weight of the composition of the flatting agent. Unfortunately, the flatting agent in these excessively loaded coating compositions tends to coagulate. As a result, the conventional low gloss coatings resulting therefrom have visually unacceptable seedy appearance. Furthermore, the presence of the excessive amount of these flatting agents in a coating composition tends to make the resultant coatings more brittle than conventional coating compositions. Thus, a need exists for durable low gloss coatings that do not have seedy appearance. The present invention addresses the problem of conventional low gloss coatings having a seedy appearance by producing low gloss coatings that have smooth surface.

Attempts have been made to produce low gloss coatings. For example, the U.S. Pat. No. 4,921,776 teaches the use of a mixture of slightly incompatible polymers applied over photographs for producing low gloss substantially transparent protective films that are laminated to photographs. However, the use of such mixtures does not result in low gloss coatings having desired coating properties, such as those required for use in automotive topcoats or basecoats. Therefore, a need still exists for a coating composition that not produce a low gloss coating having desired coating properties, such as scratch and mar resistance.

STATEMENT OF THE INVENTION

The present invention is directed to a low gloss crosslinkable coating composition that produces a low gloss coating upon cure comprising:

(a) a binder component which comprises a combination of at least two partially compatible crosslinkable components retained in an evaporable medium, whereby said low gloss coating exhibits a 60° specular gloss that is at least 5% lower than gloss of coatings from coating compositions containing any one of said crosslinkable components, and wherein the first of said crosslinkable components in said combination is:

(i) a polar polymer selected from the group consisting of a polar acrylic polymer having at least two crosslinkable functionalities, a polar polyester having at least two crosslinkable functionalities, polar polyurethane having at least two crosslinkable functionalities and a combination thereof; and wherein the second of said crosslinkable components in said combination is:

(ii) a non-polar silane polymer, non-polar acrylic polymer having at least two crosslinkable functionalities, non-polar polyester having at least two crosslinkable functionalities, non-polar polyurethane having at least two crosslinkable functionalities or a combination thereof; and (b) a crosslinking agent selected from the group consisting of monomeric melamine, polymeric melamine, polyisocyanate, and blocked polyisocyanate.

The present invention is also directed to a method of producing a low gloss coating on a substrate, said method comprising the steps of:

(I) applying a layer of a low gloss crosslinkable coating composition comprising:

(a) a binder component which comprises a combination of at least two partially compatible crosslinkable components retained in an evaporable medium, whereby said low gloss coating exhibits a 60° specular gloss that is at least 5% lower than gloss of coatings from coating compositions containing any one of said crosslinkable components, and wherein the first of said crosslinkable components in said combination is:

(iii) a polar polymer selected from the group consisting of a polar acrylic polymer having at least two crosslinkable functionalities, a polar polyester having at least two crosslinkable functionalities, polar polyurethane having at least two crosslinkable functionalities and a combination thereof; and wherein the second of said crosslinkable components in said combination is:

(iv) a non-polar silane polymer, non-polar acrylic polymer having at least two crosslinkable functionalities, non-polar polyester having at least two crosslinkable functionalities, non-polar polyurethane having at least two crosslinkable functionalities or a combination thereof; and (b) a crosslinking agent selected from the group consisting of monomeric melamine, polymeric melamine, polyisocyanate, and blocked polyisocyanate;

(II) evaporating said medium from said layer; and (III) curing said layer into said coating, which has a surface reflectance of less than 70 when measured at 60° angle of incidence under ASTM D-523-67.

The present invention is also directed to a low gloss coating on a substrate produced from the aforedescribed low gloss crosslinkable coating composition.

DETAILED DESCRIPTION OF THE INVENTION

As used herein:

"Crosslinkable components" refer to monomers, oligomers or polymers that are provided with one or more crosslinkable functionalities. These crosslinkable functionalities can be pendant from or in the backbone of the component. The term "crosslinkable functionalities" relates to those functionalities present in the component that, during cure, react with other crosslinkable functionalities present in another component of the coating composition to form a crosslinked structure.

"Two-pack coating composition" means a solvent borne crosslinkable coating composition comprising two or more crosslinkable components stored in separate containers. These containers are typically sealed to increase the shelf life of the components of the coating composition. The components are mixed prior to use and applied as a layer, typically through a spray nozzle, of desired thickness on a substrate surface, such as an autobody. After application, the solvent from the layer evaporates and the layer cures under ambient conditions, or it can be UV cured, or bake cured at elevated temperatures to form a coating on the substrate surface having the desired coating properties, such as desired gloss, scratch resistance and resistance to environmental etching.

"One-pack coating composition" means a solvent borne crosslinkable coating composition comprising two or more crosslinkable components that are stored in the same container. The crosslinkable functionalities on one or more of the crosslinkable components are not reactive at the storage temperature. After application of a layer of the one-pack coating composition on a substrate, the layer is exposed to elevated temperatures to form a coating having the desired coating properties, such as desired gloss, scratch resistance and resistance to environmental etching.

"Crosslinkable component solid" refers to the solid portion a crosslinkable component that remains after removing the evaporable portion.

"Low gloss coating" refers to a coating having a surface with a reflectance of less than 70, preferably less than 40, more preferably in the range of from 20 to 50 when measured at 60° angle of incidence under ASTM D-523-67 test with a glossimeter supplied by Byk-Gardner.

"Compatibility" means the ability of two or more crosslinkable components of a coating composition to remain retained within one another or in a solvent, such that a coating resulting therefrom does not cause appreciable scattering of light. The term "retained" means dissolved, dispersed or suspended. Contacting two or more immiscible crosslinkable components results in gross incompatibility and contacting two or more miscible crosslinkable components results in total compatibility.

"Evaporable medium" refers to a liquid medium of one or more miscible solvents that carries the various components of a coating composition and which can retain the partially compatible components, described below.

"Partially compatible components" refers to two or more crosslinkable components of a coating composition retained in an evaporable medium, such that a low gloss coating resulting therefrom exhibits a 60° specular gloss that is at least 5% lower, preferably at least 50% lower, more preferably at least 60% lower and most preferably at least 70% lower than the gloss of coatings from coating compositions containing any one of the crosslinkable components.

"GPC weight average molecular weight" and "GPC number average molecular weight" means a weight average molecular weight (Mw) and a number average molecular weight (Mn), respectively measured by utilizing gel permeation chromatography. A high performance liquid chromatograph (HPLC) supplied by Hewlett-Packard; Palo Alto, Calif. can be used. Unless stated otherwise, tetrahydrofuran was used as the liquid phase and polystyrene was used as the standard.

Although compatibility or incompatibility of polymers in solvents is a well-recognized phenomenon, the prior art does not disclose coatings prepared from blends of partially compatible crosslinkable components. On the contrary, in general the prior art teaches that partial compatibility is undesirable and is to be avoided.

Applicants have unexpectedly discovered that a low gloss coating described above is produced from a crosslinkable coating composition that includes a binder component containing a combination of at least two partially compatible crosslinkable components retained in an evaporable medium.

Applicants have discovered that a composition containing a combination of at least two partially compatible components produces micro-regions in the coating that scatters light without any significant image distortion or attenuation. As long as the micro-regions are smaller than the wavelength of the light passing through the coating, no significant image impairment results from the light scatter. In other words, though the coating appears substantially transparent having no perceptible haze, it still has gloss lower than coatings prepared from any one of the crosslinking components. Applicants have discovered that to create the aforedescribed micro-regions, the difference in the incompatibility between the two or more crosslinking components should not be too substantial, i.e., if the difference is too substantial, such crosslinking components tend to form large islands. As a result, the coating tends to become grainy and produces an image that is muddy or blurred. By contrast, if the differences in the incompatibility between the crosslinking components are too insubstantial, the resultant coating would be glossy having no appreciably lowered gloss to the degree defined earlier.

The combination of at least two partially compatible components results from including in the binder component at least one polar component and at least one non-polar component. The combination can be produced by adjusting the amount of polar component added to the amount of the non-polar component, by choosing a combination polar and non-polar component on the basis of their degree of polarity in the evaporable medium, or by a combination thereof. Other means, such as by adding a modestly polar or non-polar compatibilizing component could be also employed where more than partial compatibility exists between the crosslinkable components, so long as the result of the combination produces the desired partial compatibility, necessary for reducing the gloss to the degree defined earlier.

Suitable polar components include a polar acrylic polymer, a polar polyester, a polar polyurethane or a combination thereof, wherein all of them are provided with at least two, preferably in the range of from 2 to 10, more preferably in the range of 2 to 6 crosslinkable functionalities. Some of the suitable crosslinkable functionalities include hydroxyl, amine and urethane functionalities.

The polar acrylic polymers are preferably polymerized from a monomer mixture containing hydroxyl alkyl (meth) acrylate; and polar monomers, such as alkyl (meth)acrylate, wherein an alkyl group has up to 3, preferably 1 to 3 carbon atoms. More preferred polar acrylic polymers are polymerized from a monomer mixture containing hydroxyl ethyl methacrylate; and methyl methacrylate, methyl acrylate, ethyl methacrylate, propyl methacrylate, or a combination thereof.

The non-polar acrylic polymers are preferably polymerized from a monomer mixture containing hydroxyl alkyl (meth)acrylate; and non-polar monomers, such as styrene and alkyl (meth)acrylate wherein an alkyl group has at least 4, preferably 4 to 18, and more preferably 4 to 12 carbon atoms. More preferred non-polar acrylic polymers are polymerized from a monomer mixture containing hydroxyl ethyl methacrylate; and butyl methacrylate, butyl acrylate, ethylhexyl methacrylate, styrene or a combination thereof.

The polar and non-polar acrylic polymers preferably have a GPC weight average molecular weight in the range of from 1000 to 7000, preferably in the range of from 1500 to 5000. The acrylic polar and non-polar acrylic polymers preferably have a Tg varying in the range of from of −20° C. to 100° C. and more preferably varying in the range of from 20° C. to 80° C.

The polar and non-polar acrylic polymers are generally solution- and emulsion-polymerized using free-radical initiators. One such well-known process is disclosed in U.S. Pat. No. 5,286,782, which is incorporated herein by reference.

The polar polyesters are preferably polymerized from a monomer mixture containing polar polyols and polyacids having up to 8, preferably 3 to 8 and more preferably 3 to 6 carbon atoms. More preferred polar polyesters are polymerized from a monomer mixture containing one or more of neopentyl glycol, butanediol and trimethylol propane, and one or more of phthalic anhydride and isophthalic acid.

The non-polar polyesters are preferably polymerized from a monomer mixture containing polar polyols and polyacids having at least 9, preferably 9 to 40 and more preferably 9 to 36 carbon atoms. More preferred non-polar polyesters are polymerized from a monomer mixture containing 1,12-dodecanediol and one or more of dodecanedioic acid and dimer fatty acid.

The polar and non-polar polyesters preferably have a GPC number average molecular weight in the range of from 800 to 10,000, preferably in the range of from 800 to 2500.

The polar and non-polar polyesters suitable for use in the present invention can be conventionally polymerized from suitable polyacids, including cycloaliphatic polycarboxylic acids and suitable polyols, which include polyhydric alcohols. The details of polyester suitable for use in the present invention are further provided in U.S. Pat. No. 5,326,820, which is incorporated herein by reference.

The polar polyurethanes are preferably polymerized from a monomer mixture containing polar polyols, polyacids having up to 8, preferably 3 to 8 and more preferably 3 to 6 carbon atoms, and polyisocyanates having up to 14, preferably 6 to 14 methylene units. The polar polyurethane polymerized from a monomer mixture containing one or more of neopentyl glycol, butanediol and trimethylol propane; one or more of phthalic anhydride and isophthalic acid; and one ore more of hexane diisocyanate and isophorone diisocyanate, is more preferred.

The non-polar polyurethanes are preferably polymerized from a monomer mixture containing polar polyols, polyacids having at least 9, preferably 9 to 40 and more preferably 9 to 36 carbon atoms, and polyisocyanates having at least 15 preferably 15 to 20 methylene units. The non-polar polyurethane polymerized from a monomer mixture containing 1,12-dodecanediol; one or more of dodecanedioic acid and dimer fatty acid; and isocyanurate of hexane diisocyanate, is more preferred.

The polar and non-polar polyurethanes are conventionally produced by methods known in the art.

The low gloss crosslinkable coating composition includes a crosslinking agent. When the low gloss coating composition of the present invention is formulated as a two-pack coating composition, the crosslinking agent is packed separately and when the low gloss coating composition of the present invention is formulated as a one-pack coating composition, the crosslinking agent is not reactive at the storage temperature, such that it can be packed in the same container. Suitable crosslinking agent is selected from the group consisting of monomeric melamine, polymeric melamine, unblocked polyisocyanate and blocked polyisocyanate.

The amount of polymeric or monomeric melamine that can be used is 20 weight percent to 60 weight percent, preferably 20 weight percent to 50 weight percent and more preferably 30 weight percent to 40 weight percent of binder component solids.

Some of the suitable monomeric melamines include alkoxyl and alkylated monomeric melamines. Alkoxyl monomeric melamines are preferred.

In the context of the present invention, the term "alkoxyl monomeric melamine" means a low molecular weight melamine which contains, on an average three or more methylol groups etherized with a $C_1$ to 5monohydric alcohol such as, methanol, n-butanol, or isobutanol per triazine nucleus, and has an average degree of condensation of up to about 2 and preferably about 1.1 to about 1.8, and has a proportion of mononuclear species not less than about 50 percent by weight.

Some of such suitable monomeric melamines include highly alkylated melamines, such as methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel® 301 (degree of polymerization of 1.5, 95% methyl and 5% methylol), 303, 325, 327, 350 (degree of polymerization of 1.6, 84% methyl and 16% methylol), and 370, which are monomeric melamines. Another suitable monomeric melamine includes high amino (partially alkylated, —N, —H) melamine known as Resimene™ BMP5503 (molecular weight 690, polydispersity of 1.98, 56% buytl, 44% amino), which is supplied by Solutia Inc., St. Louis, Mo.

Suitable polymeric melamines have an average degree of condensation of more than 1.9. Cytec Industries Inc. also supplies Cymel® 1130 @80 percent solids (degree of polymerization of 2.5), Cymel® 1133 (48% methyl, 4% methylol and 48% butyl), both of which are polymeric melamines.

Applicants have also discovered that polymeric melamines tend to be more polar than monomeric melamines and thus, can be more effective in reducing gloss than the monomeric melamines.

Suitable polyisocyanates have at least two isocyanate groups and can include both compounds and polymers. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3- phenylene diisocyanate, 1,5-naphthalene diisocyanate, bis-(4-isocyanatocyclohexyl)-methane and 4,4'-diisocyanatodiphenyl ether.

Typical trifunctional isocyanates include triphenylmethane triisocyanate, 1,3,5-benzene triisocyanate and 2,4,6-toluene triisocyanate. Trimers of diisocyanates also can be used, such as the trimer of hexamethylene diisocyanate, which is supplied by Bayer Corporation, Pittsburgh, Pa., under the trademark Desmodur® N-3390. Other suitable polyisocyanates include Desmodur® N-3300, and Z-4470BA polyisocyanates. Polyisocyanate acrylic copolymer derived from isocyanatoethyl methacrylate (commercially available as TMI) can also be used.

As indicated above, the polyisocyanate can optionally be blocked. Examples of suitable blocking agents are those materials which would unblock at elevated temperatures, for example, lower aliphatic alcohols, such as methanol, phenols, oximes, such as methylethyl ketone oxime, ketoximes, and lactams, such as epsiloncaprolactam. Blocked isocyanates can be used to form one-pack coating compositions. Polyfunctional isocyanates with free isocyanate groups can be used to form two-pack coating compositions curable under ambient conditions.

The relative amount of crosslinking agent used in the coating composition is preferably adjusted to provide a molar equivalent ratio of NCO/active hydrogen such as OH and NH in the range of from 0.5 to 2, preferably in the range of from 0.75 to 1.5 and more preferably in the range of from 0.85 to 1.25.

The coating composition preferably includes one or more catalysts to enhance crosslinking of the components during curing. Generally, the coating composition includes 0.005 percent to 2 percent, preferably 0.01 to 1 percent and more preferably 0.02 percent to 0.7 percent of the catalyst, the percentages being in weight percentages based on the total weight of the binder component and crosslinking agent solids. These catalysts are preferably added to the binder component.

Some of the suitable catalysts include the conventional acid catalysts, such as aromatic sulfonic acids, for example dodecylbenzene sulfonic acid, paratoluenesulfonic acid and dinonylnaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate, which may be unblocked or blocked with an amine.

When polyisocyanate is used as a crosslinking agent it preferably includes a small amount of one or more organo tin catalysts, such as dibutyl tin dilaurate, dibutyl tin diacetate, stannous octate, and dibutyl tin oxide. Dibutyl tin dilaurate is preferred. The amount of organo tin catalyst added generally ranges from 0.001 percent to 0.5 percent, preferably from 0.05 percent to 0.2 percent and more preferably from 0.1 percent to 0.15 percent, the percentages being in weight percentages based on the total weight of composition solids.

The evaporable medium of the coating composition includes at least one organic solvent typically selected from the group consisting of aromatic hydrocarbons, such as petroleum naphtha or xylenes; aliphatic hydrocarbons, such as hexane and mineral spirit; ketones, for example, methyl amyl ketone, methyl isobutyl ketone, methyl ethyl ketone or acetone; esters, such as, butyl acetate or hexyl acetate; and glycol ether esters. Such as propylene glycol monomethyl ether acetate. The solvents can be blended to produce the desired degree of partial compatibility between the crosslinkable components described earlier. The amount of organic solvent added depends upon the desired solids level as well as the desired amount of VOC of the composition. The amount of solvent added to the coating composition can be adjusted to provide the composition with a VOC (volatile organic content) in the range of from 0.12 kilograms (1.0 pounds per gallon) to 0.78 kilograms (6.5 pounds per gallon) of the solvent per liter of the coating composition.

The coating composition of the present invention can also contain conventional additives, such as UV stabilizers, UV absorbers, rheology control agents, flow agents, toughening agents and fillers. Any additives that would adversely effect the clarity and low gloss of the coating will not be included if the composition is to be used for producing clear coatings.

The binder component and the crosslinking agent of the composition of the present invention when formulated as a two-pack coating composition are mixed just prior to use or about 5 to 30 minutes before use. A layer of the composition is typically applied to a substrate by conventional techniques, such as spraying, electrostatic spraying, roller coating, dipping or brushing. Spraying is preferred since it allows uniform application of thin layers that upon cure result in low gloss coatings having a typical thickness of 30 to 60 microns.

The layer of the coating composition substantially cures under ambient conditions in about 30 minutes to 24 hours to form a coating on the substrate having the desired coating properties. It is understood that the actual curing time depends upon the thickness of the applied layer and on any additional mechanical aids, such as fans that assist in continuously flowing air over the coated substrate to accelerate the cure rate. If desired, the cure rate can be further accelerated by exposure to UV light or by baking the coated substrate at temperatures generally in the range of from about 60° C. to 150° C. for a period of about 15 to 90 minutes. The foregoing baking step is particularly useful under OEM (Original Equipment Manufacture) conditions.

The low gloss coating of the present invention is also well suited for variety of substrates, such as steel, aluminum, plastics and wood substrates.

The low gloss coating of the present invention is especially suited for automotive OEM and refinish coating applications, such as automotive fenders and automotive side boards typically employed in cars, sport utility vehicles, pick-up trucks and trucks.

The following examples illustrate the invention.

TEST PROCEDURES

The gloss of the coating composition was determined under ASTM D-523-67 Test by measuring the reflectance at 60° angle of reflection through the glossimeter Tri-Gloss Model supplied by Byk-Gardner. Lower the reading, the lesser will be the gloss of the coating.

EXAMPLES

Example 1

A mixture of 500 parts of vinyltrimethoxysilane (UCARSIL®a- 171 by Witco), and 130 parts of methoxypropyl acetate (PM acetate® by Dow Chemical Company, Midland, Mich.) was heated to reflux. To the reaction mixture, 500 parts of butyl acrylate, 100 parts of methoxypropyl acetate, and 33 parts of tertiary butyl peroctoate were added over a period of 6 hours and 40 minutes. The reaction mixture was then held for an hour and 30 parts of methoxypropyl acetate and 7 parts of tertiary butyl peroctoate were added and then held for 30 minutes. The reaction mixture resulted in a vinyl silane containing non-polar polymer.

Example 2

To a reaction vessel, 192 parts of aliphatic solvent (Solvesso® 100 aliphatic solvent from Exxon Chemicals, Houston, Tex.) was added and heated to reflux at 150 ° C. To the mixture 89 parts of styrene, 99 parts of butyl acrylate, 88 parts of butyl methacrylate, 225 parts of hydroxypropylacrylate and 36 parts of Solvesso® 100 solvent and 7 parts of tertiary butyl peracetate were added over a period of four and half hours. The reaction mixture resulted in a styrene and hydroxyl-containing polar acrylic polymer, which was a modestly polar polymer.

Example 3

To a reaction vessel, 200 parts of Solvesso® 100 solvent was added and heated to reflux at 150 ° C. To the mixture, 518 parts of methylmethacrylate, 444 parts of butyl acrylate, 518 parts of hydroxyethylmethacrylate and 750 parts of Solvesso® 100 solvent and 30 parts of tertiary butyl peracetate were added over a period of four and half hours. The reaction mixture resulted in a methylmethacrylate and hydroxyl-containing polar acrylic polymer.

Example 4

To a reaction vessel, 400 parts of Solvessoo 100 solvent was added and heated to reflux at 150° C. To the mixture, 1200 parts of styrene, and 300 parts of hyroxypropylacrylate and 400 parts of Solvesso® 100 solvent and 60 parts of tertiary butyl peracetate were added over a period of four and half hours. The reaction mixture resulted in a styrene based non-polar polymer with 20% hydroxypropylacrylate (HPA).

Example 5

To a reaction vessel, 400 parts of Solvesso® 100 solvent was added and heated to reflux at 150° C. To the mixture, 1350 parts of styrene, and 150 parts of hyroxypropylacrylate and 400 parts of Solvesso® 100 solvent and 60 parts of tertiary butyl peracetate were added over a period of four and half hours. The reaction mixture resulted in a styrene based non-polar polymer with 10% hydroxypropylacrylate (HPA).

Example 6

One-Pack Bake Cured Low Gloss Coating Composition

Several compositions were produced by using combinations based on a polar component that included methyl methacrylate based acrylic polar polymer (Example 3), modestly polar hydroxyl-containing styrene based acrylic polymer (Example 2), and melamine as the crosslinking agent, and a non-polar component, which included the non-polar vinylmethoxysilane silane polymer (Example 1).

To a vessel, Resimene® 747 methylated melamine from Solutia (crosslinking Agent), St. Lois, Mo., butanol, Tinuvene® 928 UV absorber supplied by Ciba Specialty Chemicals, Tarrytown, N.Y., Tinuvene® 123 hindered amine light stabilizer supplied by Ciba Specialty Chemicals, Tarrytown, N.Y., amine blocked dodecylbenzenesulfonic acid catalyst (King Industries, Norwalk, Conn.), Disparlon® LC-955 flow control agent (King Industries, Norwalk, Conn.), Example 2 polymer, Example 3 polymer, Example 1 polymer, and Solvesso® 100 solvent were added with mixing in accordance with Table 1 below to produce the following compositions:

TABLE 1

|  | A | B | C | D | E | F | G | H | I | J |
|---|---|---|---|---|---|---|---|---|---|---|
| Crosslinking Agent | 0 | 24.8 | 24.8 | 24.8 | 24.8 | 24.8 | 24.8 | 24.8 | 24.8 | 24.8 |
| Butanol | 1 | 1 | 1 | 1 | 1 | 1 | 1 | 1 | 1 | 1 |
| UV Absorber | 1.2 | 1.2 | 1.2 | 1.2 | 1.2 | 1.2 | 1.2 | 1.2 | 1.2 | 1.2 |
| Stabilizer | 1.2 | 1.2 | 1.2 | 1.2 | 1.2 | 1.2 | 1.2 | 1.2 | 1.2 | 1.2 |
| Catalyst | 2.8 | 2.8 | 2.8 | 2.8 | 2.8 | 2.8 | 2.8 | 2.8 | 2.8 | 2.8 |
| Flow Control Agent | 1.7 | 1.7 | 1.7 | 1.7 | 1.7 | 1.7 | 1.7 | 1.7 | 1.7 | 1.7 |
| Example 1 Polymer | 98 | 0 | 0 | 22.2 | 22.2 | 22.2 | 22.2 | 22.2 | 22.2 | 22.2 |
| Example 2 Polymer | 0 | 75.5 | 0 | 50.1 | 0 | 8.3 | 12.5 | 16.7 | 25 | 33.4 |
| Example 3 Polymer | 0 | 0 | 88.6 | 0 | 58.8 | 49 | 44.1 | 39.2 | 29.4 | 19.6 |
| Solvesso ® 100 | 36 | 36 | 23 | 35 | 31 | 32 | 33 | 34 | 35 | 37 |
| 60°-gloss | 86 | 97 | 90 | 86 | 65 | 26 | 26 | 26 | 80 | 86 |

Layers from the coating compositions from Table 1 were conventionally cast over test substrates, which were then bake-cured at 140° C. for 30 minutes to form coatings having the thickness of 50 microns. The surfaces of the resulting coatings were smooth to touch. Examples A, B and C contained Examples 1, 2 and 3 polymers, respectively and all the coatings exhibited high gloss. Even though Example D contained both the non-polar silane polymer of Example 1 and the modestly polar acrylic polymer from Example 2, their combination was compatible, i.e., they were not partially compatible to a degree desired in the present invention. As a result, Example D still exhibited high gloss. Example E contained both the silane polymer of Example 1 and the acrylic polymer from Example 3. However, in this case, the film showed large segregated cell structure indicating excessive incompatibility, which was unacceptable. The modest gloss of this film was due to the gloss of the segregated cells. Examples F–J included increasing amounts of the acrylic polymer of Example 3, which acted as a compatibilizing polymer. In Example F, when a small amount of the acrylic polymer of Example 3 was added, the components in the combination became partially compatible. As a result, the large segregated cell structure, seen in Example E, was eliminated and the gloss was greatly reduced. Examples F–H show that when the amount of the compatibilizing polymer 2 added to the combination was increased beyond a certain range, the gloss of the coating also increased. As revealed in Examples I and J, increased addition of the compatibilizing polymer 2 eventually resulted in a compatible system and a return to high gloss.

Example 7

One-Pack Bake Cured Low Gloss Coating Composition

The polar component includes methylmethacrylate-based acrylic (Example 3), styrene-based polymer with 20% hydroxypropylacrylate (HPA) (Example 4), styrene polymer with 10% HPA (Example 5), and melamine. To a vessel, the crosslinking agent, butanol, UV absorber, light stabilizer, catalyst, flow control agent (all of which were identified in Example 6 above), Example 4 polymer, Example 5 polymer, and Solvesso® 100 solvent were added with mixing in accordance with Table 2 below to produce the following compositions:

TABLE 2

|  | K | L | M | N |
|---|---|---|---|---|
| Crosslinking agent | 24.8 | 24.8 | 24.8 | 24.8 |
| butanol | 1 | 1 | 1 | 1 |
| UV absorber | 1.2 | 1.2 | 1.2 | 1.2 |
| Light stabilizer | 1.2 | 1.2 | 1.2 | 1.2 |
| Catalyst | 2.8 | 2.8 | 2.8 | 2.8 |
| Flow control agent | 1.7 | 1.7 | 1.7 | 1.7 |
| Example 3 Polymer | 0 | 0 | 48 | 48 |
| Example 4 Polymer (20% HPA) | 79.2 | 0 | 36 | 0 |
| Example 5 Polymer (10% HPA) | 0 | 79.2 | 0 | 36 |
| Solvesso ® 100 | 36 | 36 | 28 | 28 |
| 60°-gloss | 98 | 100 | 94 | 47 |

Coatings from Examples K, L, M and N were cast using the procedure described in Example 6. Examples K and L contained Example 4 Polymer and Example 5 Polymer, respectively, but not a combination thereof. As a result, Examples K and L exhibited high gloss. Example 4 polymer polymerized from more HPA monomer than Example 5 became miscible with the Example 3 Polymer. As a result, Example M also exhibited high gloss. When the same amount of Example 5 Polymer, which has less amounts of the compatibilizing monomer (HPA) was used, it created partial compatibility. As a result the gloss is substantially reduced in Example N.

Whereas Examples A–J illustrated how the addition of a compatibilizing polymer can be used to control the degree of compatibility between two incompatible polymers, Examples K–M teach how adjusting the polymer compositions can be also used to control the compatibility.

Example 8

Two-Pack Bake Cured Low Gloss Coating Composition

The binder component included various combinations of the polar components of methylmethacrylate based acrylic polar polymer (Example 3), melamine, the modestly polar styrene based acrylic polar polymer (Example 2), and the vinylmethoxysilane non-polar polymer (Example 1). The crosslinking agent was Desmodur® N-3300 Isocyanurate of hexamethylene diisocyanate from Bayer, Pittsburgh, Pa.

To a vessel, parts in weight of Cymel® 1158 butylated melamine from Cytech, West Paterson, N.J., butanol, UV absorber, light stabilizer, catalyst, Example 2 polar polymer, Example 3 polar polymer, Example 1 non-polar polymer, and Solvesso® 100 solvent were added with mixing in proportions listed in Table 3 below to form the binder components for O, P and Q compositions below. UV absorber, light stabilizer and catalyst are identified in Example 6 above. To the Desmodur® N-3300 crosslinking agent, Solvesso® 100 solvent and phenyl acetyl phosphorus acid from King Industries, Norwalk, Conn. were added in proportions listed in Table 3 below.

TABLE 3

|  | O | P | Q |
|---|---|---|---|
| Binder Component |  |  |  |
| Melamine | 29 | 29 | 29 |
| butanol | 1.2 | 1.2 | 1.2 |
| UV absorber | 1.9 | 1.9 | 1.9 |
| Light stabilizer | 1.9 | 1.9 | 1.9 |
| Catalyst | 2 | 2 | 2 |
| Example 1 polymer | 0 | 0 | 14.7 |
| Example 2 polymer | 88.7 | 0 | 0 |
| Example 3 polymer | 0 | 101.1 | 82.6 |
| Solvesso ® 100 | 36.1 | 23.7 | 25.1 |
| Crosslinking Agent |  |  |  |
| Desmodur ® N-3300 | 23.2 | 23.2 | 23.2 |
| Solvesso ® 100 | 9 | 9 | 9 |
| phenyl acetyl phosphorus acid | 2.2 | 2.2 | 2.2 |
| 60°-gloss | 95 | 84 | 60 |

The binder components and the crosslinking agent of Examples O, P and Q above were mixed and layers were cast on substrates within 10 minutes after they were mixed. The layers cast over the substrates were then bake-cured at 140° C. for 30 minutes to form coatings having the thickness of 50 microns. The resulting coating surfaces were smooth to touch. Example O contained a modestly polar styrene based polymer of Example 2, which was compatible with the melamine. As a result, the resulting gloss was high (95). Example P contained methylmethacrylate based polar acrylic polymer of Example 3, which was partially compatible with the melamine. As a result, the gloss of Example P (84) was lower than that Example O (95). Example Q contained the non-polar silane polymer of Example 1 and a methylmethacrylate based acrylic polar polymer of Example 3. As a result, a significant reduction in the gloss (60) took place.

Comparative Example

To a vessel 631 parts of Cymel® 327 methylated polymeric melamine from Cytech Industries, from West Paterson, N.J., 28 parts of UV absorber, 14 parts of light stabilizer, 74 parts amine blocked phenyl acetyl phosphorus acid from King Industries, 764 parts the hydroxyl-containing modestly polar acrylic polymer from Example 2, 950 parts of Solvesso® 100 solvent and 60 parts of HP210® synthetic amorphous silicon dioxide (flatting agent) from Crofield, Joilet, Ill. were added with mixing to produce a comparative conventional coating composition containing the flatting agent. A layer for the low gloss coating composition was conventionally cast over a substrate, which was then bake-cured at 140° C. for 30 minutes to produce the comparative low gloss coating having a thickness of 50 microns. The resulting surface was seedy to touch indicative of the coagulation of the flatting agent. The coating had a 60°-gloss reading of 34.

What is claimed is:

1. A low gloss crosslinkable coating composition that produces a low gloss coating upon cure comprising:

(a) a binder component which comprises a combination of at least two partially compatible crosslinkable components retained in an evaporable medium, whereby said low gloss coating exhibits a 60° specular gloss that is at least 5% lower than gloss of coatings from coating compositions containing any one of said crosslinkable components, and wherein the first of said crosslinkable components in said combination is:

(v) a polar polymer selected from the group consisting of a polar acrylic polymer having at least two crosslinkable functionalities, a polar polyester having at least two crosslinkable functionalities, polar polyurethane having at least two crosslinkable functionalities and a combination thereof; and wherein second of said crosslinkable components in said combination is:

(vi) a non-polar silane polymer, non-polar acrylic polymer having at least two crosslinkable functionalities, non-polar polyester having at least two crosslinkable functionalities, non-polar polyurethane having at least two crosslinkable functionalities or a combination thereof; and (b) a crosslinking agent selected from the group consisting of monomeric melamine, polymeric melamine, polyisocyanate, and blocked polyisocyanate.

2. The coating composition of claim 1 wherein said crosslinkable functionalities comprise hydroxyl, amine, or urethane functionalities.

3. The coating composition of claim 1 wherein said polar acrylic polymer is polymerized from a monomer mixture comprising alkyl (meth)acrylate and hydroxyalkyl (meth)acrylate.

4. The coating composition of claim 3 wherein said alkyl (meth)acrylate is methyl methacrylate and said hydroxyalkyl (meth)acrylate is hydroxyethyl methacrylate.

5. The coating composition of claim 1 wherein said polar acrylic polymer or said polar polyester has a weight average molecular weight of 1000 to 7000.

6. The coating composition of claim 1 wherein said polar polyester is polymerized from a monomer mixture comprising polyols and polyacids with eight or less carbon atoms.

7. The coating composition of claim 1 wherein said polyol comprises neopentyl glycol, butanediol, trimethylol propane or a combination thereof and said polyacid comprise phthalic anhydride or isophthalic acid.

8. The coating composition of claim 1 wherein said polar polyurethane is polymerized from a monomer mixture comprising polar polyols, polyacids with eight or less carbon atoms and polyisocyanate with fourteen or less methylene units.

9. The coating composition of claim 8 wherein said polyisocyanate comprises hexane diisocyanate, isophorone diisocyanate or a combination thereof.

10. The coating composition of claim 1 wherein said non-polar acrylic polymer is polymerized from a monomer mixture comprising alkyl (meth)acrylate, styrene and hydroxyalkyl (meth)acrylate.

11. The coating composition of claim 1 wherein said non-polar polyester is polymerized from a monomer mixture comprising polyols and polyacids with more than eight carbon atoms.

12. The coating composition of claim 11 wherein said polyol is 1,12-dodecanediol and said polyacid is dodecanedioic acid, dimer fatty acid or a combination thereof.

13. The coating composition of claim 1 wherein said non-polar polyurethane is polymerized from a monomer mixture comprising polyols, polyacids with more than eight carbon atoms and polyisocynate with more than fourteen methylene units.

14. The coating composition of claim 13 wherein said polyol is 1,12-dodecanediol and said polyacid is dodecanedioic acid or dimer fatty acid.

15. The coating composition of claim 13 wherein said polyisocynate is a isocyanurate of hexane diisocyanate.

16. The low gloss coating of claim 15 wherein said 60° specular gloss is 50% to 70% lower than gloss of coatings from coating compositions containing any one of said crosslinkable components.

17. The low gloss coating of claim 15 has a surface reflectance of less than 70 when measured at 60° angle of incidence under ASTM D-523-67.

18. The coating composition of claim 1 wherein said non-polar silane polymer is polymerized from a monomer mixture comprising methacryloxypropyltrimethoxysilane, vinylmethoxysilane or a combination thereof.

19. The low gloss coating of claim 15 or 18 wherein said substrate is an automotive fender or a side-skirt.

20. The coating composition of claim 1 wherein said non-polar acrylic polymer is polymerized from a monomer mixture comprising alkyl (meth)acrylate, styrene and hydroxyalkyl (meth)acrylate.

21. The coating composition of claim 1 wherein the evaporable medium is selected from the group consisting of aliphatic hydrocarbon, aromatic hydrocarbon, ketone, ester, ether and a combination thereof.

22. The binder component of the coating composition of claim 1 further comprising a compatibilizing component.

23. The coating composition of claim 1 formulated as a low gloss clearcoat composition.

24. The coating composition of claim 1 formulated as a low gloss basecoat composition.

25. A low gloss coating on a substrate produced from a low gloss crosslinkable coating composition comprising:

a binder component which comprises a combination of at least two partially compatible crosslinkable components retained in an evaporable medium, whereby said low gloss coating exhibits a 60° specular gloss that is at least 5% lower than gloss of coatings from coating compositions containing any one of said crosslinkable components, and wherein the first of said crosslinkable components in said combination is:

(vii) a polar polymer selected from the group consisting of a polar acrylic polymer having at least two crosslinkable functionalities, a polar polyester having at least two crosslinkable functionalities, polar polyurethane having at least two crosslinkable functionalities and a combination thereof; and wherein the second of said crosslinkable components in said combination is:

(viii) a non-polar silane polymer, non-polar acrylic polymer having at least two crosslinkable functionalities, non-polar polyester having at least two crosslinkable functionalities, non-polar polyurethane having at least two crosslinkable functionalities or a combination thereof; and (b) a crosslinking agent selected from the group consisting of monomeric melamine, polymeric melamine, polyisocyanate and blocked polyisocyanate.

26. A method of producing a low gloss coating on a substrate, said method comprising the steps of:

(I) applying a layer of a low gloss crosslinkable coating composition comprising:

(a) a binder component which comprises a combination of at least two partially compatible crosslinkable components retained in an evaporable medium, whereby said low gloss coating exhibits a 60° specular gloss that is at least 5% lower than gloss of coatings from coating compositions containing any one of said crosslinkable components, and
wherein the first of said crosslinkable components in said combination is:
(ix) a polar polymer selected from the group consisting of a polar acrylic polymer having at least two crosslinkable functionalities, a polar polyester having at least two crosslinkable functionalities, polar polyurethane having at least two crosslinkable functionalities and a combination thereof; and
wherein the second of said crosslinkable components in said combination is:
(x) a non-polar silane polymer, non-polar acrylic polymer having at least two crosslinkable functionalities, non-polar polyester having at least two crosslinkable functionalities, non-polar polyurethane having at least two crosslinkable functionalities or a combination thereof; and
(b) a crosslinking agent selected from the group consisting of monomeric melamine, polymeric melamine, polyisocyanate, and blocked polyisocyanate;
(II) evaporating said medium from said layer; and
(III) curing said layer into said coating, which has a surface reflectance of less than 70 when measured at 60° angle of incidence under ASTM D-523-67.

27. The method of claim 26 wherein said curing step takes place under ambient conditions.

28. The method of claim 26 wherein said curing step takes place at an elevated temperature in the range of from 60° C. to 200° C.

* * * * *